(12) United States Patent
Laurel

(10) Patent No.: US 9,003,929 B2
(45) Date of Patent: Apr. 14, 2015

(54) OIL FILTER CAP REMOVAL AND DRAIN TOOL

(76) Inventor: Gervacio Laurel, Rio Grande City, TX (US)

( * ) Notice: Subject to any disclaimer, the term of this patent is extended or adjusted under 35 U.S.C. 154(b) by 495 days.

(21) Appl. No.: 13/396,622

(22) Filed: Feb. 15, 2012

(65) Prior Publication Data
US 2013/0206244 A1  Aug. 15, 2013

(51) Int. Cl.
| | |
|---|---|
| B25B 13/06 | (2006.01) |
| B25B 13/00 | (2006.01) |
| B25B 13/48 | (2006.01) |
| B25F 1/00 | (2006.01) |
| B25B 27/00 | (2006.01) |
| B67C 11/02 | (2006.01) |

(52) U.S. Cl.
CPC ....... *B25B 27/0042* (2013.01); *B67C 2011/025* (2013.01); *B01D 2201/24* (2013.01); *B67C 2011/022* (2013.01)

(58) Field of Classification Search
CPC ............ B67C 2011/025; B67C 2011/022; B25B 27/0042; B01D 2201/24
USPC ............... 81/52, 176.1, 176.15, 176.2, 124.2, 81/121.1; 7/100
See application file for complete search history.

(56) References Cited

U.S. PATENT DOCUMENTS

| | | | | |
|---|---|---|---|---|
| 4,177,529 A | * | 12/1979 | Sikula, Jr. | 7/100 |
| 4,867,017 A | * | 9/1989 | Holman | 81/121.1 |
| 5,533,554 A | * | 7/1996 | Young | 141/383 |

* cited by examiner

*Primary Examiner* — Bryan R Muller
(74) *Attorney, Agent, or Firm* — The Law Office of Jerry D. Haynes

(57) ABSTRACT

An oil filter removal tool and system for the removal and drainage of an oil filter comprising: an oil drain connector, where said connector connects to an oil filter cap of the oil filter; a turn bolt at a distal end of the tool, where said bolt is used to turn the removal tool; a second turn bolt, where the second turn bolt turns counter clockwise to secure the connector to the filter cap; a drain tube provided at the distal end of the tool that inserts onto a drain plug; a body portion, where the body portion secures around the oil filter and surrounds the oil drain connector; and notches, where said notches are provided around a perimeter edge of the body portion of the removal tool.

2 Claims, 1 Drawing Sheet

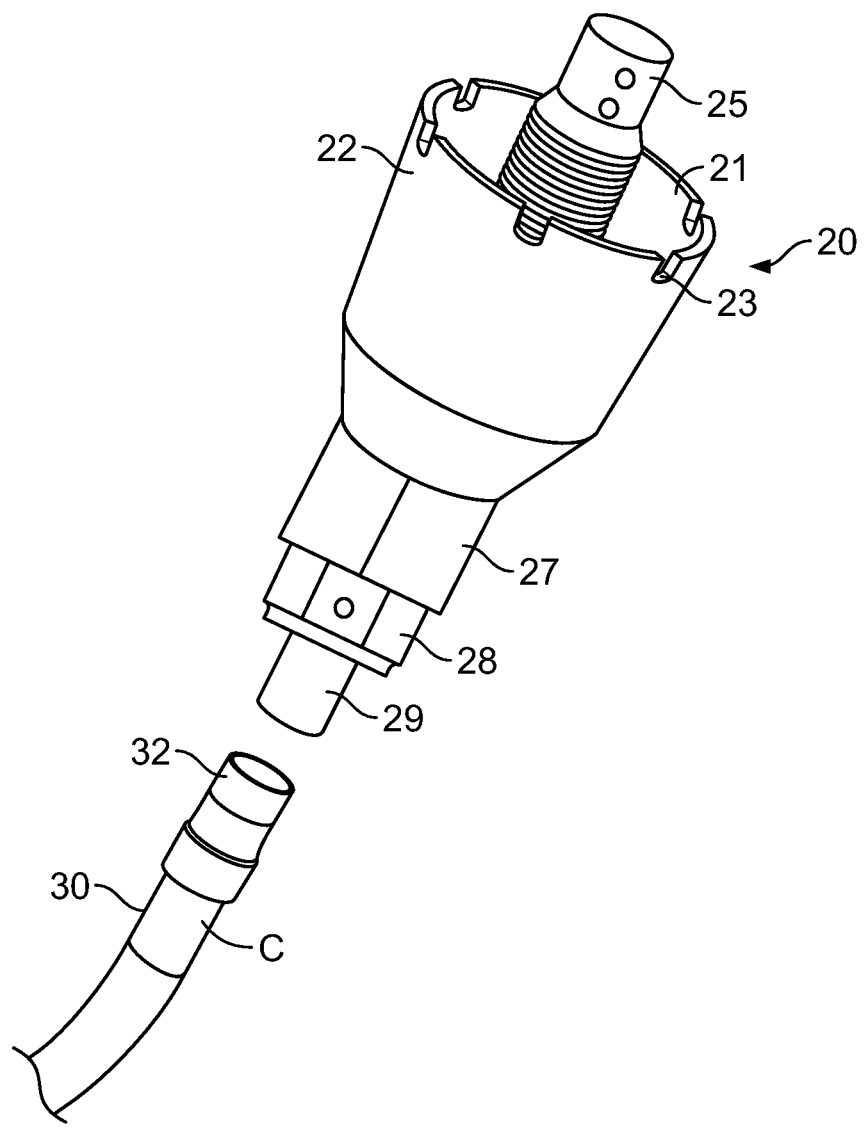

OIL FILTER CAP REMOVAL AND DRAIN TOOL

BACKGROUND OF THE INVENTION

1. Field of Invention

The present invention relates to a tool used to remove an oil filter and provide drainage of oil within the filter housing.

2. Description of Related Art

Oil is a lubricant that is utilized in an internal combustion engine. The oil functions to lubricate the moving parts, provide protection against corrosion and helps to cool the engine during use. Most oils are petroleum-based oils; however there exist a significant number of synthetic oils that have been developed in recent years. The oil is placed within the engine for lubricant purposes and helps to protect the mechanical parts from excessive friction or excessive wear and tear. A typical motor vehicle engine includes an oil filter, which helps to clean some of the buildup or residue that develops in the oil over time. However, over time the residue and sludge diminishes the effectiveness of oil. Consequently, the oil needs to be periodically replaced as a regular maintenance activity associated with the operation of a vehicle.

An oil change is typically a job that is fairly easy to accomplish by removing a drain plug allowing oil to drain from an oil reservoir within the vehicle and then the removal of the oil filter to allow the replacement of the filter when replacing the oil. The actual maintenance related to oil change is a relatively safe process. Tools have been specifically designed to assist in accomplishing the oil change. Many of the tools are related to the removal of the oil filter, which is usually a round cup-like shape that is easily accessible during the oil change process. Normally an individual changing oil uses an oil filter wrench to wrap around the oil filter, loosen it and then remove the oil filter for changing purposes. However, during use oil accumulates within the filter and surrounding the filter attachment opening. Once the oil filter is removed, oil typically spills out. Consequently, it is necessary to have a catch basin under the oil filter while the oil filter is removed for changing.

The typical oil filter wrench looks like a collar-type device that wraps around the perimeter of the oil filter to loosen the oil filter from the vehicle. In addition to the collar-type oil filter wrench, pliers have also been developed for removal of oil filters. However most of the tools available that enable the removal of an oil filter result the direct spillage of oil within the filter area upon release of the filter. Some vehicles include a filter drain that allows for the drainage of oil from the filter prior to removal of the filter. Use of such devices helps to alleviate the oil spillage as the filter is removed during the oil change process. It would consequently be advantageous to have a drainage system for the removal of oil within the filter and therefore alleviate the necessity of excessive spillage when the oil filter is removed with a conventional oil filter wrench.

SUMMARY OF THE INVENTION

The present invention relates to an oil filter removal tool and system for the removal and drainage of an oil filter comprising: an oil drain connector, where said connector connects to an oil filter cap of the oil filter; a turn bolt at a distal end of the tool, where said bolt is used to turn the removal tool; a second turn bolt, where the second turn bolt turns counter clockwise to secure the connector to the filter cap; a drain tube provided at the distal end of the tool that inserts onto a drain plug; a body portion, where the body portion secures around the oil filter and surrounds the oil drain connector; and notches, where said notches are provided around a perimeter edge of the body portion of the removal tool.

BRIEF DESCRIPTION OF DRAWINGS

FIG. 1 depicts an oil filter cap removal device in accordance with the present invention.

DETAILED DESCRIPTION

The present invention relates to an oil filter cap removal and drainage tool. The present invention provides a tool that is secured over an oil filter and provides a means for draining the oil directly from the oil filter before removal of the oil filter. The tool in accordance with the present invention also assists in the removal of the oil filter after the drainage is complete. The present invention further includes a drainage hose that attaches to the tool that allows the flow of oil from the oil filter.

In reference to FIG. 1, an oil filter removal tool 20 is depicted. The removal tool 20 includes an oil drain connector 25. The connector 25 connects to the oil filter cap to open a drain valve after the removal of a filter drain bolt. A turn bolt 27 is provided at the distal end of the tool that is used to turn the tool clockwise in order to remove the oil filter cap. A second turn bolt 28 is provided to turn the tool 20 counter-clockwise to secure the connector 25 to the filter cap and snugly place the tool in place for use. A drain tube 29 is provided at the end of the tool that inserts onto a drain plug 30. The drain plug 30 has a connector 32 that is grooved for attachment to the drain tube 29 of the removal tool 20. Once in place the oil drains into the drain plug 30 for disposal. The tool 20 includes a body portion 22 that secures around the oil filter. Notches 23 are provided around a perimeter edge 21 of the body portion 22. These notches 23 attach securely to the filter to allow for the removal of the filter after the drainage is complete. In the particular embodiment shown in FIG. 1, six evenly spaced notches 23 are provided along the perimeter edge 21, although one notch is not visible in this view. The tool operates as a filter cap removal device and may be used to install a new filter once the drainage is complete.

The process is reversed for the installation of an oil filter by placement of a replacement oil filter into the notches 23 provided on the removal tool 20. Once the replacement filter is secured within the notches it may be inserted into place and the tool turned clockwise to tighten the filter into place. The tool 20 may be maneuvered through the use of the turn bolt 27 and therefore provide a tool that is tightened with a simple open face wrench as opposed to requiring a special oil filter wrench for the removal of the oil filter. Further, the removal tool 20 according to the present invention provides a means to drain oil from the old oil filter prior to removing the filter and therefore the oil filter housing may be cleanly removed after all oil is drained. The instant invention has been shown and described in what it considers to be the most practical and preferred embodiments. It is recognized, however, that departures may be made there from within the scope of the invention and that obvious modifications will occur to a person skilled in the art.

What is claimed is:

1. An oil filter removal tool and system for the removal and drainage of an oil filter comprising:
   a. an oil drain connector, where said connector connects to an oil filter cap of the oil filter;
   b. a turn bolt at a distal end of the tool, where said bolt is used to turn the removal tool;

c. a second turn bolt, where the second turn bolt turns counter clockwise to secure the connector to the filter cap, where the second turn bolt abuts the turn bolt;

d. a drain tube provided at the distal end of the tool that inserts onto a drain plug, wherein the turn bolt, second turn bolt and drain tube are axially aligned and the drain tube extends from the second turn bolt;

e. a body portion, where the body portion secures around the oil filter and surrounds the oil drain connector and the turn bolt abuts the body portion; and f. notches, where said notches are provided around a perimeter edge of the body portion of the removal tool.

2. A method of removing an oil filter comprising the steps of:

a. removing a filter drain bolt from the filter;

b. inserting an oil drain connector onto the oil filter, where the oil drain connector comprises a connection portion of a removal tool, where the removal tool further includes a turn bolt, a second turn bolt, a drain tube, a body portion and notches around the perimeter edge of the body portion, wherein the turn bolt, second turn bolt and drain tube are axially aligned and the drain tube extends from the second turn bolt;

c. turning the second turn bolt to secure the drain connector;

d. inserting a drain plug to the drain tube;

e. allowing the drainage of oil from the oil filter;

f. securing the body portion around the oil filter by aligning the notches, with appendages extending from the oil filter; and g. rotating the removal tool by using the turn bolt to remove the oil filter.

* * * * *